United States Patent
Mansson et al.

[11] Patent Number: 5,155,980
[45] Date of Patent: Oct. 20, 1992

[54] FORMING DEVICE IN PACKAGING MACHINES

[75] Inventors: Henrik Mansson, Södra Sandby; Dennis Lundmark, Lund, both of Sweden

[73] Assignee: Tetra Alfa Holdings S.A., Pully, Switzerland

[21] Appl. No.: 705,359

[22] Filed: May 24, 1991

[30] Foreign Application Priority Data

Jun. 6, 1990 [SE] Sweden ................................ 9002019

[51] Int. Cl.$^5$ ............................................. B65B 9/06
[52] U.S. Cl. ................................................. 53/551
[58] Field of Search ................ 53/122, 526, 551, 552, 53/550

[56] References Cited

U.S. PATENT DOCUMENTS

| | | |
|---|---|---|
| 3,300,944 | 1/1967 | Thesing. |
| 3,325,961 | 6/1967 | Lindh et al. |
| 3,388,525 | 6/1968 | Thesing et al. |
| 4,413,461 | 11/1983 | Waldström ............................ 53/122 |
| 4,614,078 | 9/1986 | Kawabe ............................... 53/551 |
| 4,637,199 | 1/1987 | Steck et al. ....................... 53/551 X |
| 4,848,063 | 7/1989 | Niske ................................. 53/551 X |

FOREIGN PATENT DOCUMENTS

| | | |
|---|---|---|
| 0091712 | 5/1988 | European Pat. Off. |
| 2321539 | 1/1975 | Fed. Rep. of Germany. |
| 324132 | 5/1970 | Sweden. |
| 327359 | 8/1970 | Sweden. |
| 339438 | 10/1971 | Sweden. |
| 387914 | 9/1976 | Sweden. |

*Primary Examiner*—John Sipos
*Assistant Examiner*—Linda B. Johnson
*Attorney, Agent, or Firm*—Burns, Doane, Swecker & Mathis

[57] ABSTRACT

Forming devices in packaging machines of the type which reforms tubular packaging material of substantially circular cross-sectional configuration into individual package containers of quadrilateral cross-sectional configuration normally consist of pairwise cooperating forming flaps which are of U-shaped cross-section. In order to prevent the packaging material from being pinched between the shank surfaces of the flaps when the flaps are caused to surround the packaging material tube, the shank surfaces are designed to be undulatory, i.e. alternatingly with projections and recesses which fit in one another and guide the packaging material tube into the U-shaped recesses of the flaps without pinching the packaging material tube.

10 Claims, 2 Drawing Sheets

FORMING DEVICE IN PACKAGING MACHINES

FIELD OF THE INVENTION

The present invention relates to a forming device in a packaging machine of the type which forms, from a tubular, flexible packaging laminate, individual package containers. More particularly, the present invention concerns a forming device that includes cooperating flaps of U-shaped cross-section which abut one another for the formation of a substantially quadrilateral space for receiving a portion of the laminate tube.

BACKGROUND OF THE INVENTION

In the manufacture of consumer packages for liquid contents such as milk, juice or the like, use is often made of a flexible laminate comprising layers of paper and plastics. In one prior art type of packaging machine, the packaging laminate is supplied in web form. The machine—under continuous advancement of the laminate—progressively reforms the laminate into a tube which is filled with the desired contents, transversely sealed and cut off in the sealing zones for the formation of individual, liquid-tight package containers. In connection with the transverse sealing, forming processing of the packaging material tube also takes place so that its substantially circular cross-sectional configuration is converted into a quadrilateral, preferably rectangular, cross-sectional configuration. This forming process takes place using pairwise cooperating flaps which are U-shaped in cross-section and which are pivotal between an open position and a closed position in which they together surround a portion of the laminate tube and cause the tube to assume the desired quadrilateral cross-sectional configuration. Each packaging machine comprises at least two pairs of flaps which, in addition to the above-mentioned operative movements between open and closed positions, are also reciprocated along the packaging material tube so that they alternatingly surround a portion of the packaging material tube and progressively displace it downwardly.

In the manufacture of package containers using the above method, it has been found that, in certain types of packaging laminates, pinch or clamp deformation occasionally occurs in the packaging material tube. When the flaps are pivoted from the open to the closed position, the tube is pinched between the shanks of the U-shaped flaps, which gives the packaging laminate longitudinal, sharp creases and, on occasions, also causes the plastic layer of the packaging laminate to be damaged so that leakage occurs. Naturally, this is undesirable and may, in addition, in the manufacture of sterile package containers, cause sterility in the interior of the packaging laminate tube to be breached so that a risk of infection to the packed contents arises.

Many attempts have previously been made to obviate the above-outlined problem, for example by coating the inside of the flaps with a low friction material in order that the packaging laminate may more readily slide into the U-shaped recesses of the flaps and is not pinched between the flaps. However, despite this and other attempts to solve this problem, no satisfactory solution has hitherto been presented.

OBJECTS OF THE INVENTION

One object of the present invention is to devise, in the above-mentioned type of packaging machine, forming flaps which do not suffer from the above-outlined drawbacks but instead make it possible to impart to the packaging laminate tube, without any risk of clamp deformation, a quadrilateral, preferably square or rectangular cross-section.

A further object of the present invention is to devise a forming device which is straightforward in design and may readily be manufactured at low cost and retrofitted to existing packaging machines.

SOLUTION

The above and other objects have been attained according to the present invention in that a forming device is constructed such that the shank surfaces of each mutually cooperating pair of flaps include projections for guiding the laminate tube on the operative stroke of the flaps in a direction towards one another.

By providing, in accordance with the present invention, the flaps with suitably shaped projections, the packaging laminate tube can, on closure movement of the flaps, be smoothly guided into the U-shaped recesses of the flaps so that the risk of parts of the tube being pinched between the flaps is entirely eliminated, as has been confirmed by practical trials.

BRIEF DESCRIPTION OF THE ACCOMPANYING DRAWINGS

One preferred embodiment of the device according to the present invention will now be described in greater detail hereinbelow, with particular reference to the accompanying, schematic Drawings which merely illustrate those details indispensable to an understanding of the invention.

DESCRIPTION OF PREFERRED EMBODIMENT

Figure 1:
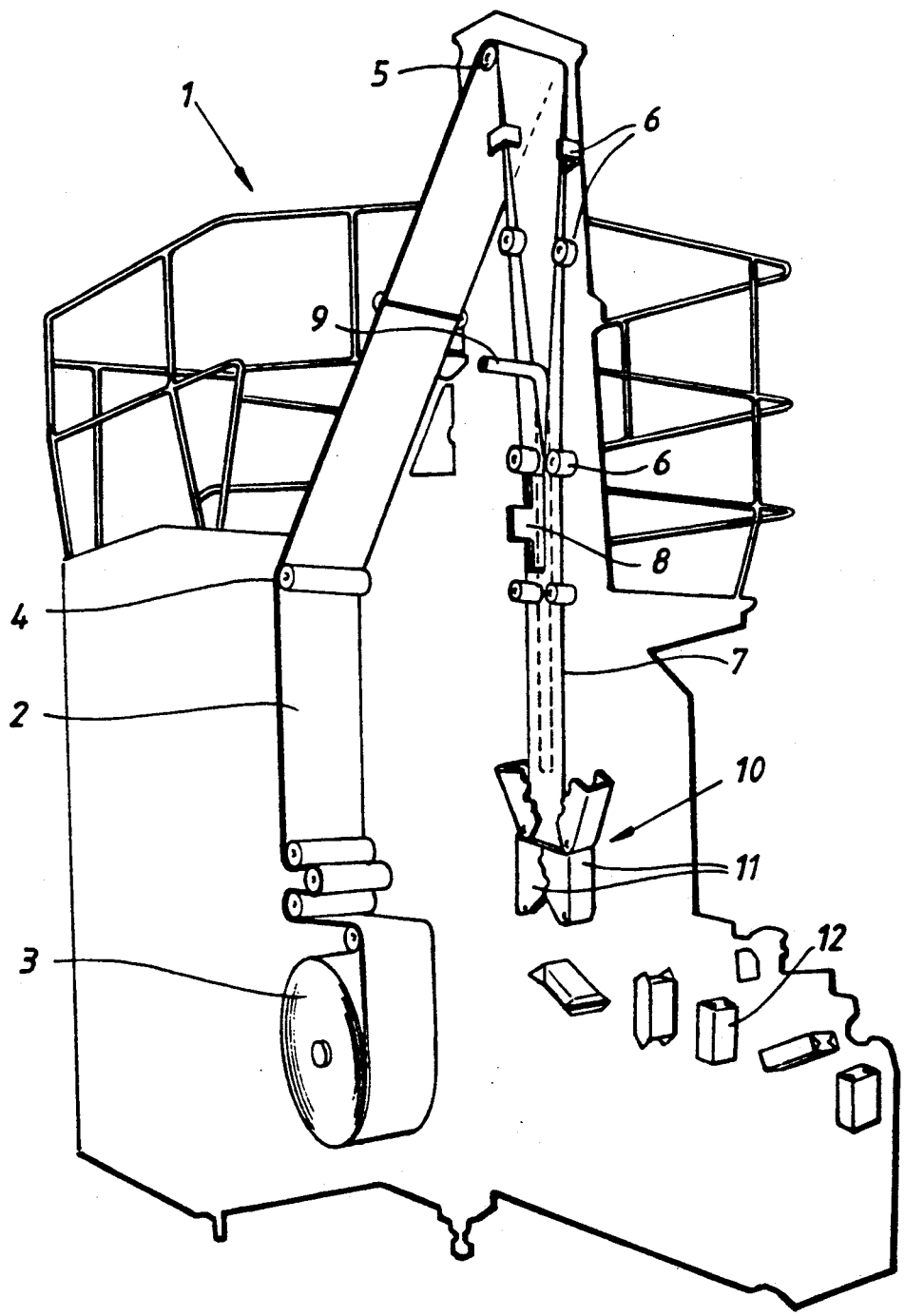
FIG. 1 is a schematic illustration of the basic principle of reforming web-shaped packaging laminate into individual package containers in a packaging machine of known type.

The device according to the present invention may be employed in different types of known packaging machines but is, above all, intended for that type of packaging machine 1 whose outer contour is schematically illustrated in FIG. 1. This and similar packaging machines manufacture consumer packages or cartons for liquid contents such as milk or juice from a flexible packaging laminate which comprises a carrier layer of fibre material, normally paper, which is coated on either face with a liquid-tight layer of thermoplastic material, preferably polythene. The packaging laminate may also include additional layers for improving the gas-tightness or opacity of the laminate, for example aluminium foil. The packaging laminate 2 is fed into the packaging machine 1 from a magazine in the form of a reel 3, from which the web-shaped packaging laminate 2 is led, by the intermediary of a number of guide rollers 4, up to the upper region of the machine where a bending roller 5 guides the packaging laminate web substantially vertically downwards through the machine. On its way down through the machine, the packaging laminate 2 is reformed with the aid of a number of folding devices 6 progressively into a packaging material tube 7 so that the longitudinal edges of the material web are folded in and sealed to one another in a liquid-tight longitudinal splice with the aid of a heat-sealing device 8. After the sealing, the packaging material tube 7 is filled with the intended liquid contents by the intermediary of a filler pipe 9 which extends in through the open end of the packaging material tube 7 and thereafter substantially vertically downwardly so as to discharge in the interior of the packaging material tube immediately above a number of forming devices 10 disposed at the outside of the tube. The forming devices 10 include flaps 11 which cooperate in pairs so as to reform the packaging material tube 7 (which is substantially circular in cross-section) into the quadrilateral or rectangular cross-section which the finished package containers 12 are to display. After final folding, i.e. inward folding of the corner flaps and fins created during the forming process, the package containers are finished and are discharged from the packaging machine.

The above-described method of reforming web-shaped packaging laminate into individual, substantially parallelepipedic package containers is well-known in this art and, therefore, neither the method nor the packaging machine selected by way of example will need any detailed description in this context.

Figure 2:
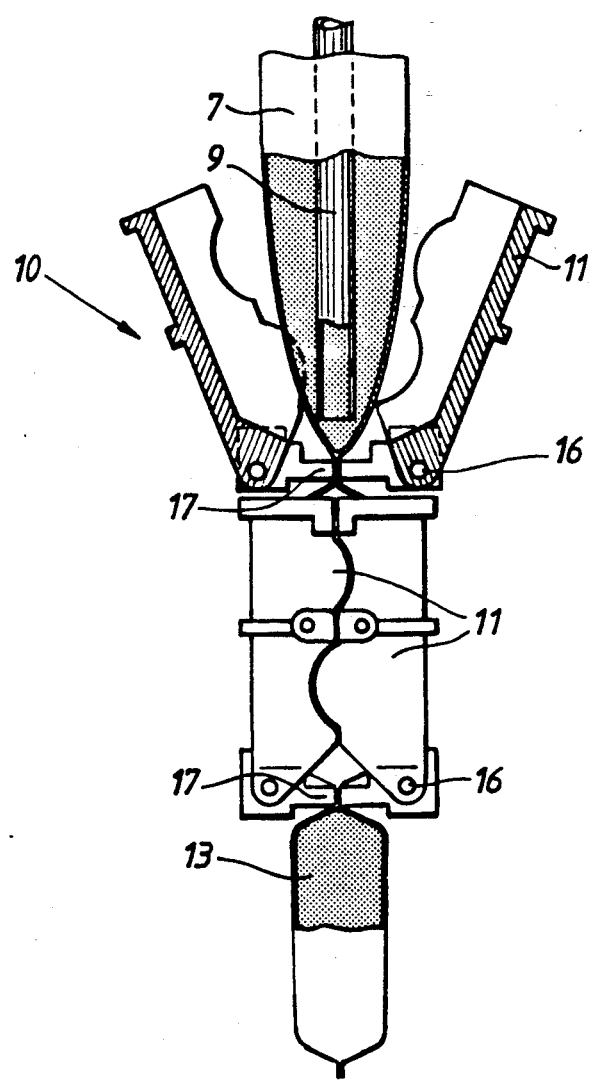
FIG. 2 is a schematic illustration of the operating principle of the forming device according to the present invention.
Figure 3:
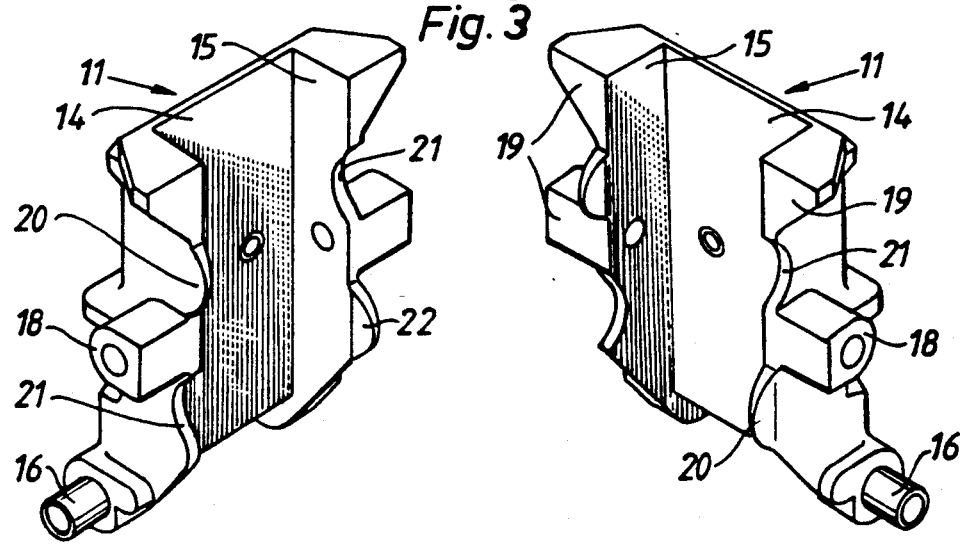
FIG. 3 is an enlarged perspective view of the pair of forming flaps according to the present invention.

The forming device 10 according to the invention is illustrated in greater detail in FIG. 2 which shows a portion of a packaging material tube 7 which has been formed in a packaging machine of, for example, the above-mentioned prior art type. The packaging material tube 7 is shown partly in section and it is clearly apparent how the filler pipe 9 discharges inside the packaging material tube 7 and how liquid contents 13 flow out from the discharge end of the filler pipe 9. The progressive reforming of the packaging material tube 7 from a substantially circular cross-section to a rectangular or quadrilateral cross-section takes place with the aid of the forming device 10, which comprises flaps 11 disposed on either side of the packaging material tube 7, the flaps being disposed in pairs and facing one another. Each flap 11 is of substantially U-shaped cross-section (FIG. 3), with a web 14 and two mutually parallel shanks 15 that define an inner space. At the bottom, each flap 11 is provided with a stub shaft 16 which extends substantially horizontally and connects each flap 11 to a sealing jaw 17. The sealing jaws are movably connected, via arms and operating devices (not shown), to the frame of the packaging machine 1 so that, when the machine is in operation, they may be displaced partly in a direction towards and away from one another in a substantially horizontal plane, and partly up and down between an upper and a lower position which substantially correspond to the positions illustrated in FIG. 2. The flaps 11 are also maneuverable (pivotal) between two different positions, namely an open position as illustrated uppermost in FIG. 2, and a closed position or operative position which is illustrated lowermost in FIG. 2. This maneuver is effected by means of linkages (not shown) which are connected to maneuver lugs 18 projecting on either side of the flaps 11. The suspension of both the sealing jaws 17 and the flaps 11, as well as the manner in which they are driven while the machine proper is in operation are well known in this art and will not be described in greater detail here (for a more detailed description, please refer, for example, to European Patent Specification EP-91.712).

As has been mentioned previously, each flap 11 includes a web 14 and two shanks 15 whose working surfaces facing the packaging material tube 7 are located substantially normal to one another, whereby two mutually abutting flaps together form a space which is quadrilateral in cross-section for the packaging material tube, whose circumference substantially corresponds to the circumference of the quadrilateral space. When the flaps 11 are located in their operative position, the end or shank surfaces 19 of the shanks 15 abut against one another so that the size of the quadrilateral forming space created by the flaps for the packaging material tube 7 is accurately defined. The shank surfaces 19 comprise, on the one hand, planar regions at the upper end of the flaps and in register with the previously mentioned maneuver lugs 18, and, on the other hand, interjacent projections 20 and recesses 21 which are alternatingly disposed in such a manner that the one shank of the flap has a projection located above the maneuver lug 18 and a recess 21 located beneath the maneuver lug, while, in the other shank, the recess 21 is located above the maneuver lug and the projection 20 is located beneath. Since the flaps 11 are identical, the projections 20 and recesses 21 in both of the flaps will fit into one another when the flaps are brought together to their operative position with the shank surfaces 19 abutting against one another. At their outer end, the projections 20 are provided with a bevel 22 which reduces resistance on the first contact of the shank 15 with the outside of the packaging material tube 7.

When the forming device according to the present invention is employed in a packaging machine of the above-described type which, with the aid of two cooperating pairs of forming flaps, alternatingly processes and advances a packaging material tube 7, the upper pair of sealing jaws 17 illustrated in FIG. 2 are first brought together so that the packaging material tube is locally compressed in a transverse, relatively narrow region where, by heating, the thermoplastic layer of the laminate is caused to fuse into the formation of a liquid-tight seal. On bringing together of the sealing jaws 17, the flaps 11 are located in the open position, i.e. they incline somewhat outwardly so that they do not come into direct contact with the packaging material tube during the operative stroke movement of the sealing jaws 17. From the position illustrated uppermost in FIG. 2, the flaps 11 are thereafter progressively brought together in that they are actuated, by the intermediary of the maneuver lugs 18, in a direction towards one another, in such instance pivoting about their respective stub shafts 16 so that the outer regions of the shank surfaces 19 of the flaps (i.e. the bevels 22 of the projections 20) will come into contact with the outside of the packaging material tube 7. On the continued closure together of the flaps 11 and displacement of the associated pair of sealing jaws 17 to the position illustrated lowermost in FIG. 2, the packaging material tube will, with the aid of the projections 20 and subsequently the parallel working surfaces of the shanks 15, be progressively compressed and reformed into a quadrilateral cross-sectional configuration in abutment against both the working surfaces of the shanks 15 and the webs 14. Because of the projections 20 and the recesses 21 cooperating therewith, no rectilinear abutment surface occurs between the shanks 15 of the flaps, whereby it is possible to avoid the risk that parts of the packaging material tube be pinched and possibly damaged between the shank surfaces 19, which has previously constituted a major problem. Since the shank surfaces 19 according to the present invention are instead as good as undulatory and, in addition, provided with the bevels 22, the packaging laminate may readily be fed into position on the operative stroke movement of the flaps, and it has proved in practice that pinch or clamp damage to the tube can be entirely avoided by the employment of the forming flaps according to the present invention. When the sealing jaws 17 have reached the lower position illustrated in FIG. 2, sealing of the transverse regions of the packaging material tube 7 is completed and the sealing jaws 17 are once again retracted away from one another, entraining the flaps 11 which are now also returned to the somewhat outwardly directed open position as illustrated uppermost in FIG. 2. In this manner, the sealing jaws 17 and their associated flaps 11 alternatingly process the tube 7 so that this, by means of the transverse seals, is divided into separate (but still continuous) package containers of substantially quadrilateral cross-section. A subsequent severing of the package containers in the transverse sealing region and further processing of projecting sealing fins and corner flaps result in a final product in the form of parallelepipedic package containers of well-known type. By designing the shank surfaces 19 of the forming flaps with projections and recesses, it is possible to dispense with the planar, parallel shank surfaces which had previously caused pinching of the packaging material tube with resultant leakage and possibly also loss of sterility in packaging machines for packing sterile contents. The novel type of flap proposed according to the present invention is simple to manufacture and may be utilized without difficulty in existing packaging machines, whereby troublesome tube deformation problems will be permanently obviated.

The present invention should not be considered as restricted to that described above and shown on the Drawings, many modifications being conceivable without departing from the spirit and scope of the appended claims.

What is claimed is:

1. A forming device for use in packaging machines of the type in which individual package containers are formed from a tubular, flexible packaging laminate, the device comprising a pair of flaps, each of said flaps having a substantially U-shaped cross-section defined by a web and two facing shanks, said U-shaped cross-section defining an inner space, each of said shanks having a shank surface and said flaps being adapted to cooperate with one another such that the shank surfaces of one flap substantially abut the shank surfaces of the other flap during operation of the forming device and so that the webs and shanks of the cooperating flaps define a substantially quadrilateral space for receiving a portion of the tubular packaging laminate, one of the shank surfaces of at least one of the flaps comprising a projection and one of the shank surfaces of the other flap comprising a recess, the projection on the one flap cooperating with the recess on the other flap when the shank surfaces of the two flaps substantially abut one another to help guide the tubular packaging laminate and help prevent the tubular packaging laminate from becoming pinched between the shank surfaces of the flaps, said projection having an end and an inner surface facing towards said inner space, and said end of the projection being bevelled on the inner surface.

2. The forming device in accordance with claim 1, wherein each of the shank surfaces of both flaps comprises a projection and a recess, the projections and recesses on one of the flaps cooperating with the recesses and projections respectively on the other flap when the shank surfaces of the two flaps substantially abut one another.

3. The forming device in accordance with claim 1, wherein the end of the projection that is bevelled is positioned distally from the web.

4. The forming device in accordance with claim 1, wherein the projection and the recess on each flap are spaced apart by a planar region of the shank surface.

5. A forming device for forming a tubular packaging laminate into individual package containers, comprising a pair of flaps which each have a substantially U-shaped cross-section that defines an inner space, each of said flaps having a shank surface that is adapted to substantially abut against the shank surface of the other flap upon operative stroke movement of the flaps in order to define a substantially quadrilateral space for receiving a portion of the tubular packaging laminate, the shank surface of each of the flaps comprising a projection for helping to guide the tubular packaging laminate without pinching the tubular packaging laminate between the shank surfaces of the flaps, each of said projections having an end portion, the end portion and an inner surface facing towards said inner space of each projection being bevelled on the inner surface.

6. The forming device in accordance with claim 5, wherein the shank surface of each of said flaps comprises a recess that is positioned so that the recess on each flap cooperates with the projection on the other flap when the shank surfaces are brought into substantial abutment with one another upon operative stroke movement of the flaps.

7. The forming device according to claim 6, wherein the projection and the recess on each flap are separated by a planar region of the shank surface.

8. The forming device according to claim 5, wherein each flap includes two shank surfaces and each shank surface comprises a projection and a recess.

9. A forming device for forming a tubular packaging laminate into individual package containers, comprising a pair of flaps which each have a shank surface and a recessed portion defining an inner space so that when the shank surfaces of the two flaps are brought into substantial abutting relation with respect to one another upon operative stroke movement of the flaps the recessed portions define a substantially quadrilateral space for receiving a portion of the tubular packaging laminate, the shank surface of each of the flaps being undulatory to help guide the tubular packaging laminate into the recessed portions upon operative stroke movement of the flaps and to help prevent the tubular packaging material from becoming pinched between the shank surfaces of the flaps, the undulatory shank surface of each flap comprising a projection, said projections having an end portion and an inner surface facing towards said inner space and the end portion of at least one projection being bevelled on the inner surface.

10. The forming device in accordance with claim 9, wherein the undulatory shank surface of each flap also comprises a recess.

* * * * *